(12) United States Patent
Nagatomi et al.

(10) Patent No.: US 11,338,743 B2
(45) Date of Patent: May 24, 2022

(54) VEHICLE WHEEL

(71) Applicant: HONDA MOTOR CO., LTD., Tokyo (JP)

(72) Inventors: Kenichi Nagatomi, Wako (JP); Toshimitsu Maki, Wako (JP); Ryoji Inaba, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 401 days.

(21) Appl. No.: 16/445,877

(22) Filed: Jun. 19, 2019

(65) Prior Publication Data

US 2019/0389400 A1 Dec. 26, 2019

(30) Foreign Application Priority Data

Jun. 22, 2018 (JP) .............................. JP2018-119058

(51) Int. Cl.
| | | |
|---|---|---|
| *B60R 13/08* | (2006.01) | |
| *G10K 11/172* | (2006.01) | |
| *B60B 21/12* | (2006.01) | |

(52) U.S. Cl.
CPC .......... *B60R 13/0884* (2013.01); *B60B 21/12* (2013.01); *G10K 11/172* (2013.01)

(58) Field of Classification Search
CPC .... G10K 11/172; B60R 13/0884; B60B 21/12

USPC ......................................................... 181/141
See application file for complete search history.

(56) References Cited

U.S. PATENT DOCUMENTS

| | | | | |
|---|---|---|---|---|
| 6,309,026 | B1 * | 10/2001 | Svedhem ................ | B60C 19/00 152/209.2 |
| 9,604,583 | B2 * | 3/2017 | Seo ....................... | B60R 13/0884 |
| 10,433,048 | B2 * | 10/2019 | Tsang ..................... | H04R 9/025 |
| 2014/0346843 | A1 * | 11/2014 | Kamiyama ............. | B60B 21/12 301/5.1 |
| 2015/0047920 | A1 * | 2/2015 | Zhu ........................ | B60C 19/002 181/211 |
| 2016/0059624 | A1 * | 3/2016 | Mohan .................... | B60B 21/12 301/95.11 |

FOREIGN PATENT DOCUMENTS

| | | | | |
|---|---|---|---|---|
| GB | | 2163103 A | *  2/1986 | ............... B60B 7/00 |
| JP | | 2012-045971 A | 3/2012 | |
| WO | WO-2017159829 A1 | *  9/2017 | ............. B60B 21/12 | |

* cited by examiner

*Primary Examiner* — Forrest M Phillips
(74) *Attorney, Agent, or Firm* — Rankin, Hill & Clark LLP

(57) ABSTRACT

A vehicle wheel includes: a pair of vertical walls that are provided upright on an outer circumferential surface of a well portion and extend in a circumferential direction; and a sub air chamber member that is provided between the pair of vertical walls to be held by frictional force generated between the sub air chamber member and the pair of vertical walls and includes an extending wall portion.

6 Claims, 5 Drawing Sheets

VEHICLE WHEEL

BACKGROUND OF THE INVENTION

1. Field of the Invention

The present invention relates to a vehicle wheel.

2. Description of the Related Art

There has been known a Helmholtz resonator that is arranged on an outer circumferential surface of a well portion of a wheel, in which two edge portions protruding in a wheel width direction are locked in circumferential grooves provided as recesses on rims (e.g., see Japanese Patent Application Publication No. 2012-45971).

This Helmholtz resonator is easily fitted in the circumferential grooves by pressing the Helmholtz resonator against the outer circumferential surface of the well portion to elastically deform the two edge portions. Thus, this Helmholtz resonator can be easily mounted in the wheel.

SUMMARY OF THE INVENTION

However, in the conventional wheel including such a Helmholtz resonator (e.g., see the abovementioned patent literature), the circumferential grooves for mounting the resonator have to be formed by cutting the rim. Thus, the conventional wheel has been having a problem of complicated production steps that increase the production cost. In addition, the high-speed rotation of the tire during the vehicle's traveling generate considerably great centrifugal force in the Helmholtz resonator mounted on the outer circumferential surface of the well portion. The mounting configuration of the resonator has to withstand the centrifugal force.

In view of this, an object of the present invention is to provide a vehicle wheel that can prevent detachment of a Helmholtz resonator from a rim due to centrifugal force with a simple configuration.

A vehicle wheel of the present invention that solves the abovementioned problem includes: a pair of vertical walls that are provided upright on an outer circumferential surface of a well portion and extend in a circumferential direction; and a Helmholtz resonator that is provided between the pair of vertical walls and held by frictional force generated between the Helmholtz resonator and the pair of vertical walls.

According to the present invention, it is possible to prevent detachment of a Helmholtz resonator from a rim due to centrifugal force with a simple configuration.

BRIEF DESCRIPTION OF THE DRAWINGS

FIG. 3 is a cross-sectional view taken along the line in FIG. 1 illustrating the vehicle wheel according to the first embodiment of the present invention, while

DETAILED DESCRIPTION OF THE EMBODIMENTS

Next, a vehicle wheel according to embodiments of the present invention is described in detail with reference to the drawings. In the referenced FIGS. 1 to 7, "X" indicates a wheel circumferential direction, "Y" indicates a wheel width direction, and "Z" indicates a wheel radial direction. In the wheel width direction Y, an inner side is called "one side," and an outer side is called "the other side."

<Overall Configuration of Vehicle Wheel>

Figure 1:
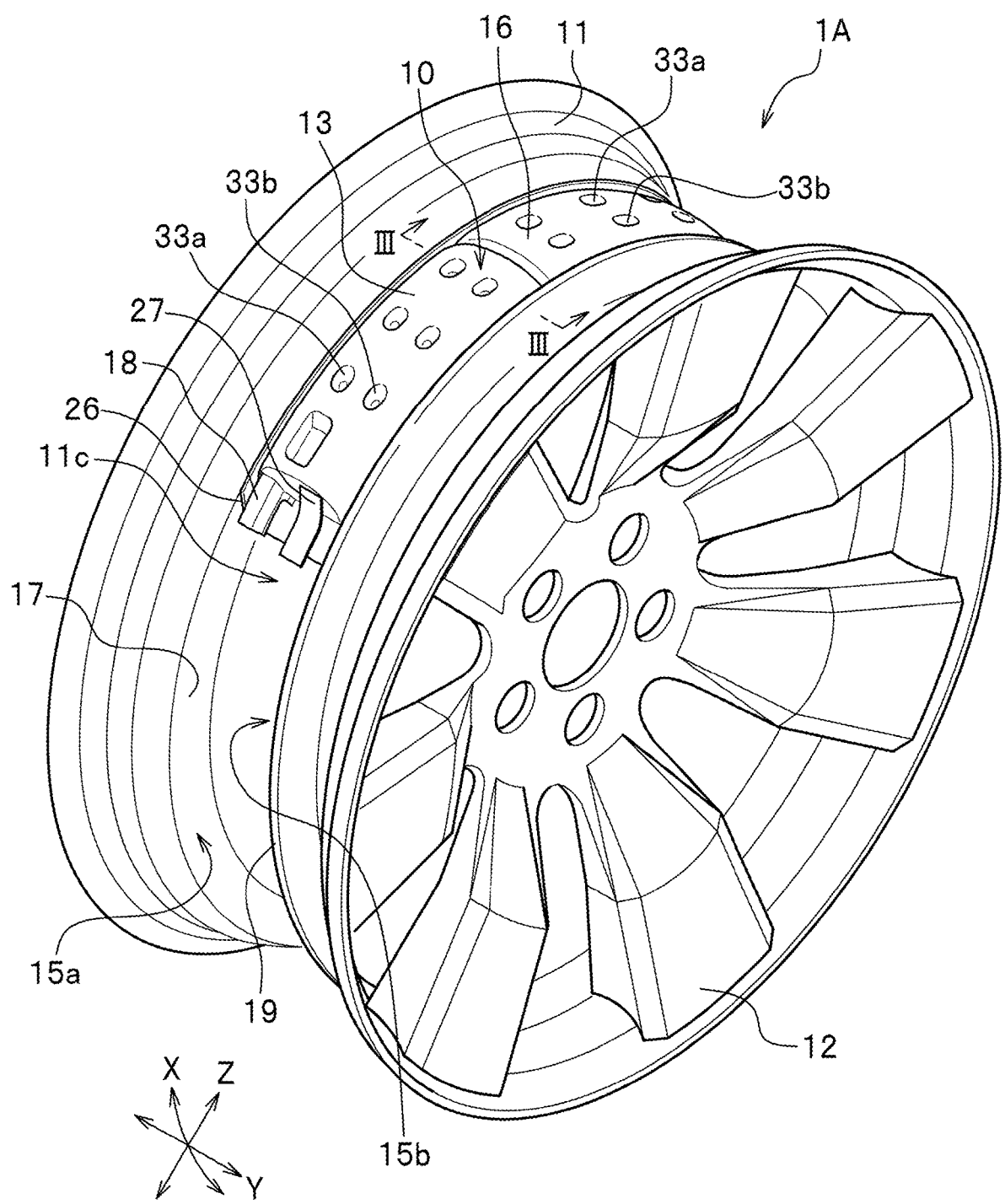
FIG. 1 is a perspective view of a vehicle wheel according to a first embodiment of the present invention.

FIG. 1 is a perspective view of a vehicle wheel 1A according to a first embodiment of the present invention. As illustrated in FIG. 1, the vehicle wheel 1A according to this embodiment is formed by mounting a sub air chamber member 10 (Helmholtz resonator) on a rim 11. The sub air chamber member 10 (Helmholtz resonator) is made of synthetic resin such as polyamide resin, and the rim 11 is made of metal such as an aluminum alloy or a magnesium alloy, for example. In FIG. 1, a reference sign 12 indicates a substantially circular plate-shaped disc for coupling the substantially cylindrical-shaped rim 11 to an unillustrated hub.

The rim 11 includes a well portion 11c that is recessed inward in the wheel radial direction (toward the center of rotation) between unillustrated bead seats respectively formed in two end portions in the wheel width direction Y. An outer circumferential surface 11d (see FIG. 4) of the well portion 11c defined in a bottom surface of the recess has a substantially same radius about a wheel shaft at any positions in the wheel width direction Y.

The rim 11 in this embodiment includes a pair of a vertical wall 15a and a vertical wall 15b. The pair of vertical walls 15a and 15b stand outward from the outer circumferential surface 11d in the wheel radial direction while having a predetermined distance therebetween in the wheel width direction Y. Note that the vertical wall 15a formed on the one side (inner side) in the wheel width direction Y is, for example, the one formed on a rising portion 17 that is formed from the outer circumferential surface 11d of the well portion 11c toward a rim flange. The vertical wall 15b is, for example, the one included in a circumferential wall 19 extending in the wheel circumferential direction X in the middle of the outer circumferential surface 11d in the wheel width direction Y.

The pair of vertical walls 15a and 15b each extend in a circular shape in the wheel circumferential direction X while having the predetermined distance therebetween to form the later-described opposing side surfaces 14 (see FIG. 3B). Each of the side surfaces 14 forms, for example, a substantially right angle with the outer circumferential surface 11d (see FIG. 3B).

<Sub Air Chamber Member>

Figure 2:
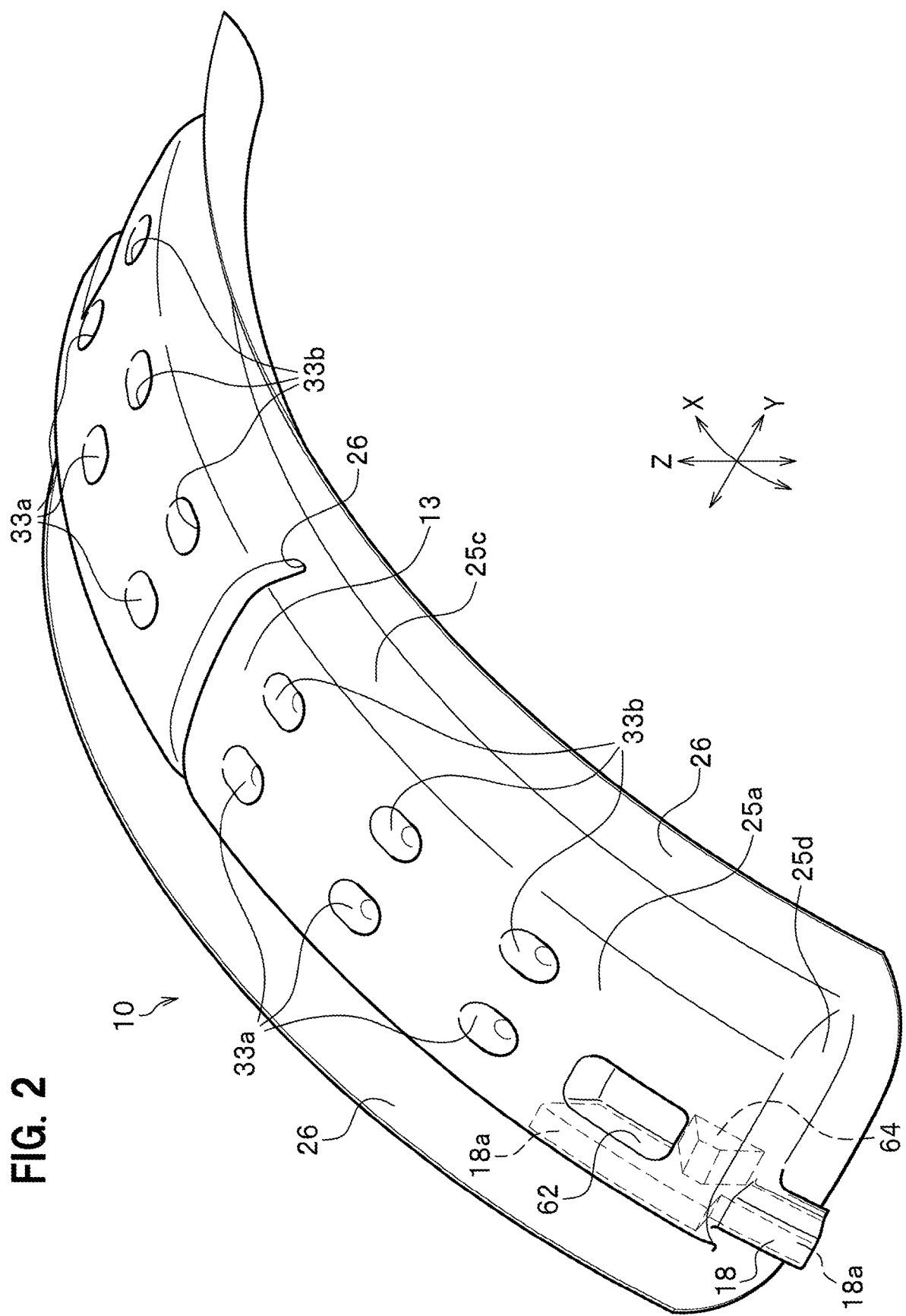
FIG. 2 is an overall perspective view of a sub air chamber member.
Figure 3A:
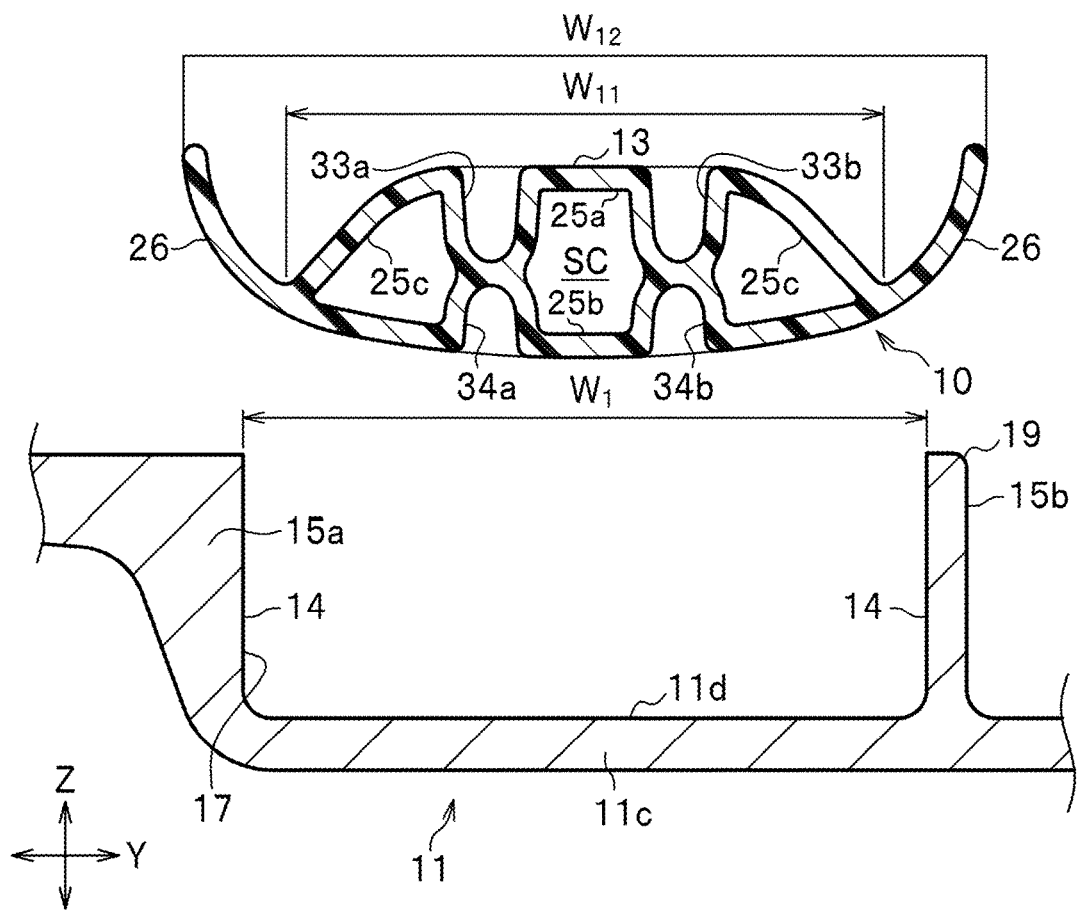
FIG. 3A is a diagram that illustrates a state of pre-mounting and FIG. 3B is a diagram that illustrates a state of post-mounting.

Next, the sub air chamber member 10 is described. FIG. 2 is an overall perspective view of the sub air chamber member 10. FIG. 3 is a cross-sectional view taken along the III-III line in FIG. 1, while FIG. 3A is a diagram that illustrates a state of pre-mounting and FIG. 3B is a diagram that illustrates a state of post-mounting. As illustrated in FIG. 2, the sub air chamber member 10 is a member that is long in one direction and includes a main body portion 13 and a tube body 18. This sub air chamber member 10 is formed to be symmetric in the wheel circumferential direction X about a partition wall 16, which extends in the wheel width direction Y at the center of the main body portion 13.

The main body portion 13 is curved in its longitudinal direction. That is, the main body portion 13 extends along the wheel circumferential direction X when the sub air chamber member 10 is mounted on the outer circumferential surface 11d (see FIG. 1) of the well portion 11c (see FIG. 1). Inside of the main body portion 13 is hollow. The (unillustrated) hollow portion forms the later-described sub air chamber SC (see FIG. 3). The hollow portion is partitioned in two in the wheel circumferential direction X by the partition wall 16.

As illustrated in FIG. 3, in the main body portion 13, a section orthogonal to a longitudinal direction (the wheel circumferential direction X in FIG. 2) is a substantially rectangular that is long in the wheel width direction Y. Specifically, the main body portion 13 includes a bottom portion 25b (bottom plate) arranged along the outer circumferential surface 11d of the well portion 11c, side portions 25c (side plates) respectively arranged along the side surfaces 14 of the pair of vertical walls 15, and a top portion 25a (top plate) arranged opposite to the bottom portion 25b that are connected to each other to form the substantially rectangular.

In this embodiment, a height of the main body portion 13 from the outer circumferential surface 11d (height in the wheel radial direction Z) is equal to or lower than heights of the pair of vertical walls 15a and 15b. The top portion 25a, the bottom portion 25b, and the side portions 25c circumferentially form the sub air chamber SC in the main body portion 13. The main body portion 13 includes a pair of end wall portions 25d and 25d that close end portions in the wheel circumferential direction of the sub air chamber SC.

Multiple top connectors 33a are formed on the top portion 25a close to the vertical wall 15a along a longitudinal direction of the top portion 25a. Multiple top connectors 33b are formed on the top portion 25a close to the vertical wall 15b along the longitudinal direction of the top portion 25a. The multiple top connectors 33b are formed to be aligned with the multiple top connectors 33a in the wheel width direction Y.

As illustrated in FIG. 3, multiple bottom connectors 34a are formed on positions corresponding to the top connectors 33a on the bottom portion 25b close to the vertical wall 15a. Multiple bottom connectors 34b are formed on positions corresponding to the top connectors 33b on the bottom portion 25b close to the vertical wall 15b.

The top connectors 33a and 33b and the bottom connectors 34a and 34b each have a substantially bottomed cylindrical shape. The top connectors 33a and the bottom connectors 34a are connected to each other at their bottoms. The top connectors 33b and the bottom connectors 34b are connected to each other at their bottoms as well. This allows the top portion 25a and the bottom portion 25b to be integrally connected to form the sub air chamber SC therein.

In this embodiment, the top portion 25a and the bottom portion 25b are integrally connected by the top connectors 33a and 33b and the bottom connectors 34a and 34b formed as recesses of both the top portion 25a and the bottom portion 25b. However, the present invention may also have a configuration in which the top portion 25a and the bottom portion 25b are integrally connected by (unillustrated) connectors formed as recesses of a part of either one of the top portion 25a and the bottom portion 25b that are connected to the other one of the top portion 25a and the bottom portion 25b.

Next, the tube body 18 (see FIG. 1) is described. As illustrated in FIG. 1, the tube body 18 is formed to protrude from the main body portion 13 in the wheel circumferential direction X at a position deviated to the one side in the wheel width direction Y (inner side of the vehicle wheel 1) in the main body portion 13.

As described above, the sub air chamber member 10 of this embodiment is formed symmetric in the wheel circumferential direction X about the partition wall 16. Thus, although only one tube body 18 is illustrated in FIG. 1, a pair of tube bodies 18 of this embodiment are arranged at symmetric positions at two end portions in the longitudinal direction (wheel circumferential direction X) of the main body 13.

As illustrated in FIG. 2, a communication hole 18a is formed in the tube body 18.

The communication hole 18a further extends from the inside of the tube body 18 to the inside of the main body portion 13. The communication hole 18a extending in the main body portion 13 is formed by partitioning a part of a hollow portion in the main body portion 13 by a division wall 62. The division wall 62 in this embodiment is formed of a recess portion 60 that is formed as a recess from the top portion 25a to the bottom portion 25b and a recess portion 64 that is formed as a recess from the bottom portion 25b to the top portion 25a. This communication hole 18a allows the sub air chamber SC (see FIG. 3) formed in the main body portion 13 and a tire air chamber 9 (see FIG. 3) formed between a top of the well portion 11c (see FIG. 3) and the (unillustrated) tire to communicate with each other.

As described above, the sub air chamber member 10 of this embodiment is, for example, a blow-molded product using synthetic resin such as polyamide resin. The above-mentioned synthetic resin is not particularly limited; however, it is preferably polyamide resin with polyamide MXD6 as base resin and nylon 6.

The sub air chamber member 10 further includes a pair of extending wall portions 26 and 26. The pair of extending wall portions 26 and 26 extend from end portions in the width direction of the bottom portion 25b of the main body portion 13. The bottom portion 25b and the pair of extending wall portions 26 and 26 integrally form an arc shape protruding toward the center in the wheel radial direction. That is, each extending wall portion 26 is formed to be curved outward in the wheel radial direction as being away from the bottom portion 25b. The bottom portion 25b is formed to extend in the circumferential direction farther than the two end portions in the circumferential direction of the main body portion 13, and the pair of extending wall portions 26 and 26 correspond to the bottom portion 25b and are formed to be longer than the main body portion 13 in the circumferential direction.

In the state of pre-mounting, a width direction dimension W11 of the main body portion 13 (the bottom portion 25b) of the sub air chamber member 10 is set to be smaller than a distance W1 between the pair of vertical walls 15a and 15b (W11<W1). A width direction dimension W12 of the entirety (the bottom portion 25b and the extending wall portions 26 and 26) of the sub air chamber member 10 is set to be greater than the distance W1 between the pair of vertical walls 15a and 15b (W12>W1). That is, the pair of extending wall portions 26 and 26 form a fastening margin (a press fitting margin) with respect to the pair of vertical walls 15a and 15b.

Figure 3B:
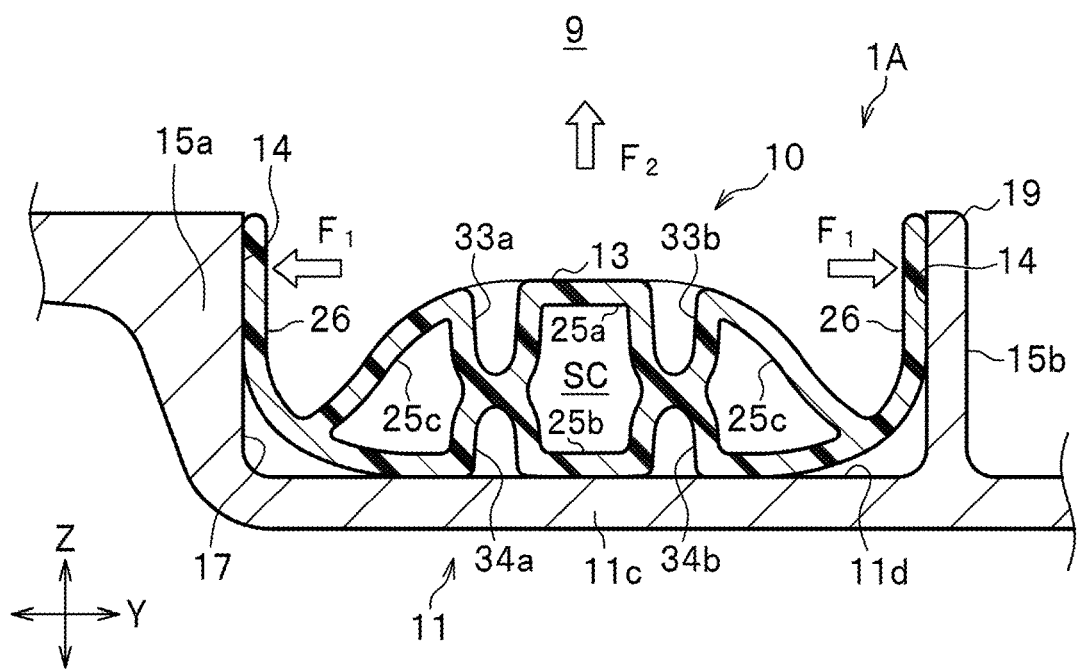

As illustrated in FIG. 3B, the sub air chamber member 10 is inserted and provided between the pair of vertical walls 15a and 15b. The pair of extending wall portions 26 and 26 are elastically deformed to be folded toward the center in the width direction of the sub air chamber member 10 and are pressed to the pair of vertical walls 15a and 15b by own restoring force F1. That is, frictional force (static frictional force) between the vertical walls 15a and 15b and the extending wall portions 26 and 26 is increased by the restoring force F1. When the vehicle wheel 1A is rotated and centrifugal force F2 is applied to the sub air chamber member 10, the sub air chamber member 10 is held between the pair of vertical walls 15a and 15b (on the outer circumferential surface 11d of the well portion 11c) with the frictional force.

The bottom portion 25b and the pair of extending wall portions 26 and 26 form the arc shape protruding toward the center in the wheel radial direction. Thus, in the bottom portion 25b and the pair of extending wall portions 26 and 26, when the vehicle wheel LA is rotated and centrifugal force F2 is applied to the sub air chamber member 10, the center in the width direction of the bottom portion 25b tries to rise from the well portion 11c. That is, the bottom portion 25b and the pair of extending wall portions 26 and 26 are deformed and spread to be a straight line in the alignment direction of the pair of vertical walls 15a and 15b. In this case, the pair of extending wall portions 26 and 26 are further pressed to the pair of vertical walls 15a and 15b, and the frictional force between the vertical walls 15a and 15b and the extending wall portions 26 and 26 is further increased. This makes it possible to preferably prevent detachment of the sub air chamber member 10 from the pair of vertical walls 15a and 15b.

Figure 4:
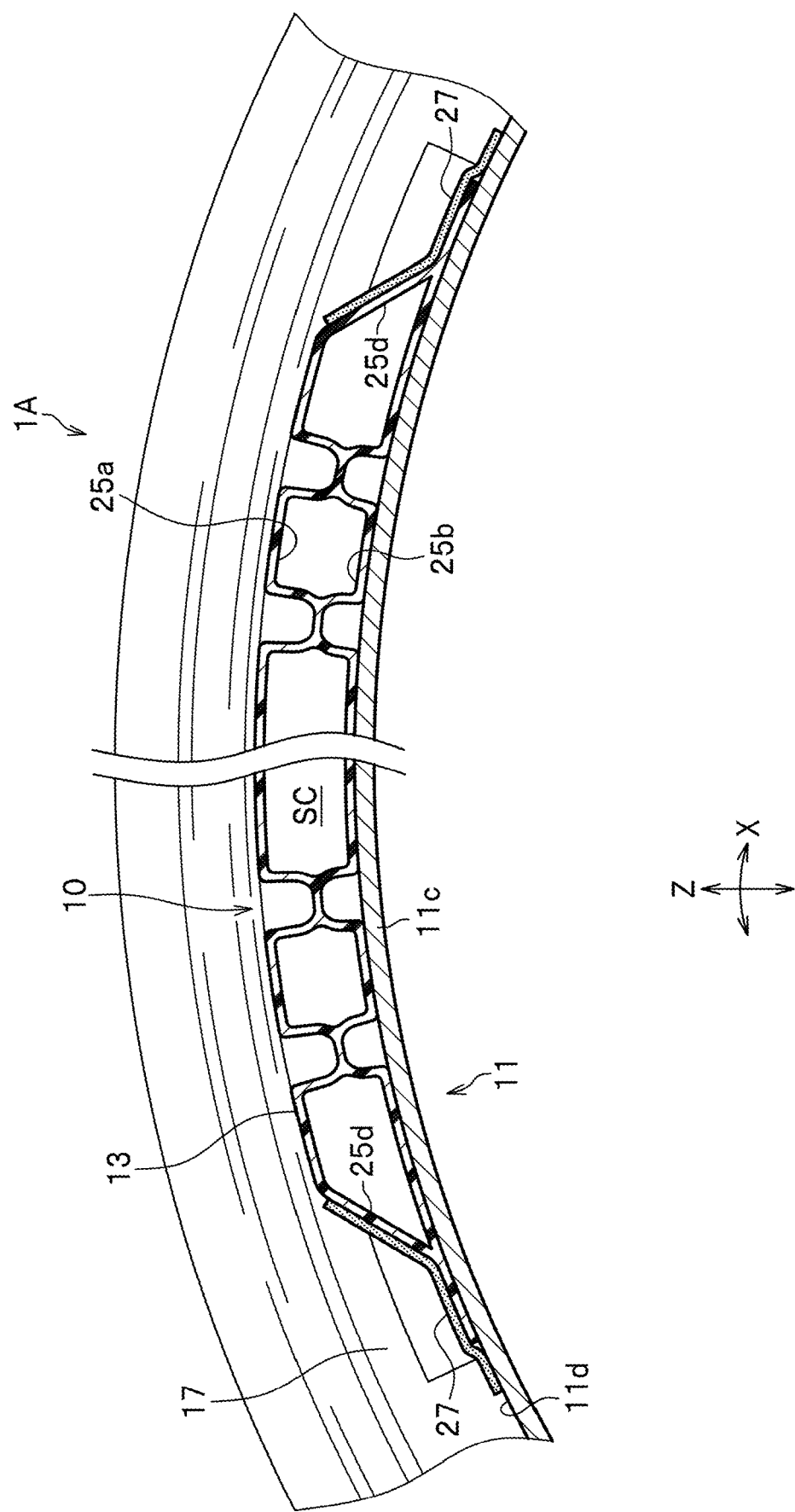
FIG. 4 is a cross-sectional view of the vehicle wheel according to the first embodiment of the present invention viewed from a wheel width direction.

As illustrated in FIG. 4, the vehicle wheel 1A according to this embodiment includes a pair of fixing reinforcement portions 27 and 27. The pair of fixing reinforcement portions 27 and 27 are for fixing each of the two end portions in the circumferential direction of the sub air chamber member 10 on the well portion 11c. In this embodiment, each fixing reinforcement portion 27 is a tape applied from the outer circumferential surface 11d of the well portion 11c over an outer top surface (the bottom portions 25b and the end wall portions 25d in the end portions in the circumferential direction) of the sub air chamber member 10.

<Operations and Effects>

Next, operations and effects achieved by the vehicle wheel 1A of this embodiment are described.

The vehicle wheel 1A of this embodiment is characterized in that the vehicle wheel 1A of this embodiment includes the pair of vertical walls 15a and 15b that are provided upright on the outer circumferential surface 11d of the well portion 11c and extend in the circumferential direction and the Helmholtz resonator (sub air chamber member 10) that is provided between the pair of vertical walls 15a and 15b and held by the frictional force generated between the Helmholtz resonator and the pair of vertical walls 15a and 15b.

According to this vehicle wheel 1A, it is possible to preferably prevent the detachment of the Helmholtz resonator from the rim due to the centrifugal force with a simpler configuration than the configuration of the case of providing the circumferential grooves on the vertical walls to lock the Helmholtz resonator.

The Helmholtz resonator is characterized in that, when the Helmholtz resonator is held between the pair of vertical walls 15a and 15b, the Helmholtz resonator takes on such a shape that the Helmholtz resonator 10 is going to be deformed and spread in the alignment direction of the pair of vertical walls 15a and 15b due to the centrifugal force caused by rotation of the vehicle wheel 1A.

According to this vehicle wheel 1A, the frictional force between the pair of vertical walls 15a and 15b and the Helmholtz resonator is increased by the centrifugal force. Thus, it is possible to more preferably prevent the detachment of the Helmholtz resonator from the rim due to the centrifugal force.

The vehicle wheel 1A is characterized in that the vehicle wheel 1A includes the fixing reinforcement portion that fixes the end portions in the circumferential direction of the Helmholtz resonator on the well portion 11c and at least either of the pair of vertical walls 15a and 15b.

According to this vehicle wheel 1A, fixing of the end portions in the circumferential direction of the Helmholtz resonator, from which the Helmholtz resonator is likely to be detached due to the centrifugal force, is reinforced. Thus, it is possible to more preferably prevent the detachment of the Helmholtz resonator from the rim due to the centrifugal force.

Second Embodiment

Figure 5A:
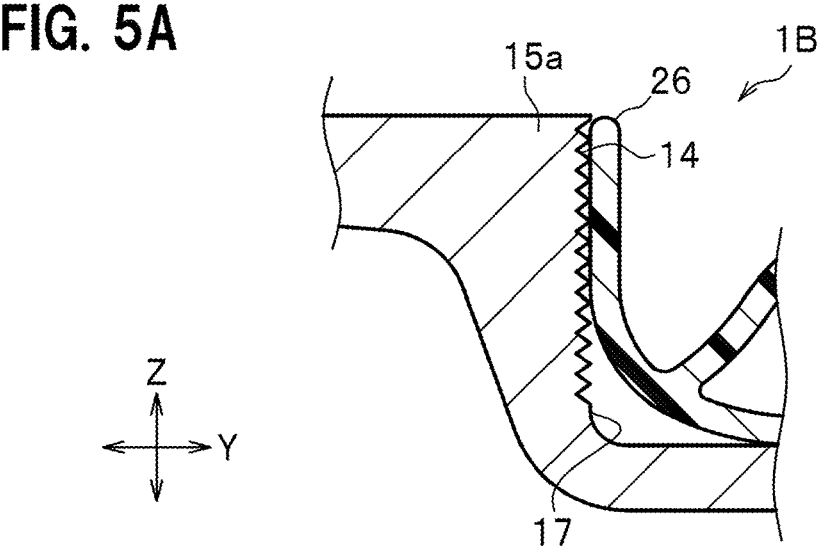
FIG. 5 is a partially enlarged cross-sectional view of a vehicle wheel according to a second embodiment of the present invention.

Next, a vehicle wheel according to a second embodiment of the present invention is described while focusing on the difference with the vehicle wheel 1A according to the first embodiment. As illustrated in FIG. 5, in a vehicle wheel 1B according to the second embodiment of the present invention, surface roughness of the side surface 14 of the vertical wall 15a is made for more preferably preventing the detachment of the sub air chamber member 10 due to the centrifugal force by increasing the frictional force generated between the side surface 14 of the vertical wall 15a and the extending wall portion 26 of the sub air chamber member 10 (the same applies to the vertical wall 15b). This surface roughness is achieved by surface processing that makes the surface roughness of the side surface 14 greater than that with no processing.

<Operations and Effects>

Next, operations and effects achieved by the vehicle wheel 1B of this embodiment are described.

The vehicle wheel 1B of this embodiment is characterized in that the surface processing is performed and the surface roughness of the side surfaces of the pair of vertical walls with which the Helmholtz resonator is in contact is set greater than that with no processing.

According to this vehicle wheel 1B, it is possible to more preferably prevent the detachment of the Helmholtz resonator from the rim due to the centrifugal force by preferably setting the frictional force between the pair of vertical walls 15a and 15b and the Helmholtz resonator.

Third Embodiment

Figure 6:
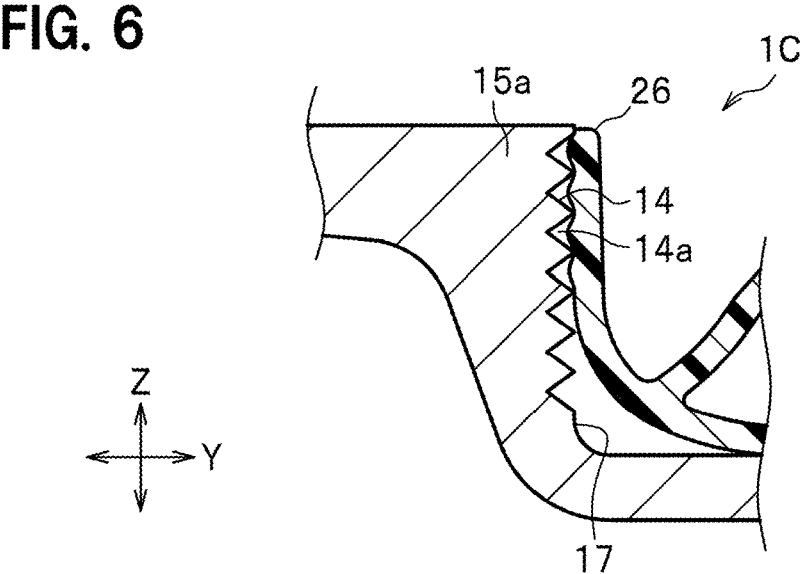
FIG. 6 is a partially enlarged cross-sectional view of a vehicle wheel according to a third embodiment of the present invention.

Next, a vehicle wheel according to a third embodiment of the present invention is described while focusing on the difference with the vehicle wheel 1A according to the first embodiment. As illustrated in FIG. 6, in a vehicle wheel 1C according to the third embodiment of the present invention, a thread portion (female thread portion) 14a is formed on the side surface 14 of the vertical wall 15a (the same applies to the vertical wall 15b). The thread of the thread portion 14a is formed to extend in the wheel circumferential direction. That is, on the side surface 14, the protrusion portions and the recess portions of the thread portion 14a are alternately formed in the wheel radial direction. This thread portion 14a is shallower than the circumferential groove of the conventional technique and is implemented by the surface processing on the side surface 14.

<Operations and Effects>

Next, operations and effects achieved by the vehicle wheel 1C of this embodiment are described.

The vehicle wheel 1C of this embodiment is characterized in that the thread portion 14a is formed on each of the side surfaces 14 and 14 of the pair of vertical walls 15a and 15b with which the Helmholtz resonator is in contact.

According to this vehicle wheel 1C, it is possible to more preferably prevent the detachment of the Helmholtz resonator from the rim due to the centrifugal force by fitting of the Helmholtz resonator into the recess portions of the screw portion 14a.

Fourth Embodiment

Figure 7:
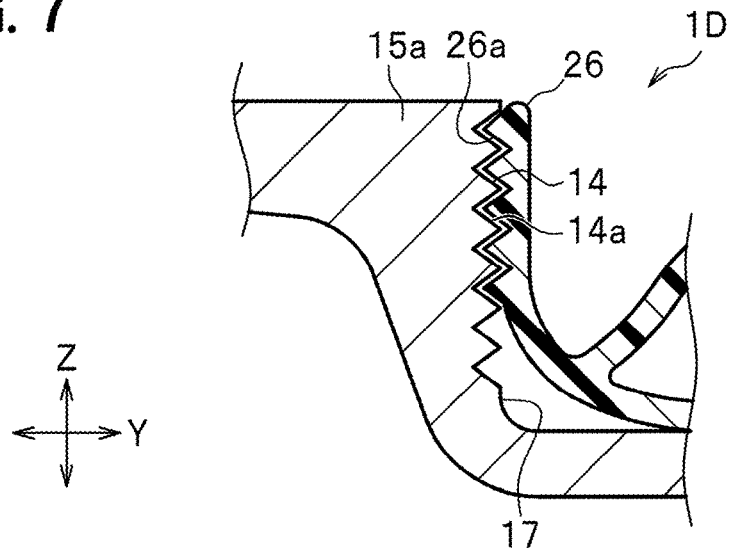
FIG. 7 is a partially enlarged cross-sectional view of a vehicle wheel according to a fourth embodiment of the present invention.

Next, a vehicle wheel according to a fourth embodiment of the present invention is described while focusing on the difference with the vehicle wheel 1C according to the third embodiment. As illustrated in FIG. 7, in a vehicle wheel 1D according to the fourth embodiment of the present invention, a thread portion (male thread portion) 26a corresponding to the thread portion 14a is formed on a surface of the extending wall portion 26 with which the vertical wall 15a is in contact (the same applies to the extending wall portion 26 close to the vertical wall 15b). The thread portion 14a and the thread portion 26a are fitted with each other.

<Operations and Effects>

Next, operations and effects achieved by the vehicle wheel 1D of this embodiment are described.

The vehicle wheel 1D of this embodiment is characterized in that the thread portion 26a that fits to the thread portion 14a is formed on the Helmholtz resonator.

According to this vehicle wheel 1D, it is possible to more preferably prevent the detachment of the Helmholtz resonator from the rim due to the centrifugal force by fitting of the protrusion portions of the thread portion 26a into the recess portions of the screw portion 14a.

Although the embodiments of the present invention are described above, the present invention is not limited to those above embodiments and may be implemented in various forms. In the above embodiments, the sub air chamber member 10 made of only synthetic resin (see FIG. 3) is assumed to be used. However, the sub air chamber member 10 may be made of two or more kinds of different materials. In addition, the fixing reinforcement portion 27 is not limited to that describe above. Anything may be applied as long as it can fix the end portions in the circumferential direction of the sub air chamber member 10 on the well portion 11c and at least either of the pair of the vertical walls 25a and 25b without frictional force (e.g., an adhesive and the like).

What is claimed is:

1. A vehicle wheel, comprising:
   a pair of vertical walls that are provided upright on an outer circumferential surface of a well portion and extend in a circumferential direction; and
   a Helmholtz resonator that is provided between the pair of vertical walls and held by frictional force generated between the Helmholtz resonator and the pair of vertical walls,
   wherein:
   the Helmholtz resonator is fit into a space between the pair of vertical walls by deforming the Helmholtz resonator;
   a width of the Helmholtz resonator in a wheel width direction is greater than an interval between the pair of the vertical walls before the Helmholtz resonator is fit into the space between the pair of vertical walls; and
   an interval between an inner side surface of one vertical wall of the pair of vertical walls and an inner side surface of the other vertical wall of the pair of vertical walls is substantially constant from upper ends to lower ends of the pair of vertical walls.

2. The vehicle wheel according to claim 1, wherein when the Helmholtz resonator is held between the pair of vertical walls, the Helmholtz resonator takes on such a shape that the Helmholtz resonator is going to be deformed and spread in an alignment direction of the pair of vertical walls due to centrifugal force caused by rotation of the vehicle wheel.

3. The vehicle wheel according to claim 1, further comprising:
   a fixing reinforcement portion that fixes end portions in the circumferential direction of the Helmholtz resonator on the well portion and at least either of the pair of vertical walls,
   wherein the fixing reinforcement portion is a tape applied from an outer circumferential surface of the well portion over an outer top surface of the Helmholtz resonator.

4. The vehicle wheel according to claim 1, wherein the inner side surfaces of the pair of vertical walls are subjected to a surface processing that makes a surface roughness of the inner side surfaces greater than the surface roughness of the inner side surfaces with no processing.

5. A vehicle wheel, comprising:
   a pair of vertical walls that are provided upright on an outer circumferential surface of a well portion and extend in a circumferential direction; and
   a Helmholtz resonator that is provided between the pair of vertical walls and held by frictional force generated between the Helmholtz resonator and the pair of vertical walls,
   wherein:
   the Helmholtz resonator is fit into a space between the pair of vertical walls by deforming the Helmholtz resonator;
   a width of the Helmholtz resonator in a wheel width direction is greater than an interval between the pair of the vertical walls before the Helmholtz resonator is fit into the space between the pair of vertical walls; and
   a thread portion is formed on each of side surfaces of the pair of vertical walls with which the Helmholtz resonator is in contact.

6. The vehicle wheel according to claim 5, wherein the Helmholtz resonator is provided with a thread portion that fits to the thread portion formed on the each of inner side surfaces of the pair of vertical walls.

* * * * *